United States Patent [19]

Kume

[11] 3,853,097
[45] Dec. 10, 1974

[54] TORCH NOZZLE ORIENTATION FOR INTERNAL COMBUSTION ENGINE

[75] Inventor: Tadashi Kume, Tokyo, Japan

[73] Assignee: Honda Giken Kogyo Kabushiki Kaisha (Honda Motor Co., Ltd.), Tokyo, Japan

[22] Filed: Apr. 23, 1973

[21] Appl. No.: 353,785

Related U.S. Application Data

[63] Continuation-in-part of Ser. No. 292,995, Sept. 28, 1972, abandoned.

[52] U.S. Cl......... 123/32 SA, 123/32 ST, 123/75 B, 123/32 SP, 123/32 AA, 123/32 C, 123/191 S, 123/DIG. 9
[51] Int. Cl........................ F02b 19/10, F02b 19/16
[58] Field of Search......... 123/32 SP, 32 SA, 32 ST, 123/32.4, 32.3, 75 B, 32 AA, 191 S

[56] References Cited
UNITED STATES PATENTS

| | | | |
|---|---|---|---|
| 1,616,157 | 2/1927 | Werner | 123/32 SA |
| 2,065,419 | 12/1936 | Bagnulo | 123/32 SA |
| 2,142,280 | 1/1939 | Mock | 123/32 SA |
| 2,184,357 | 12/1939 | Mallory | 123/32 SA |
| 2,690,742 | 10/1954 | Kuepfer | 123/32.3 |
| 2,769,434 | 11/1956 | Witzky | 123/32.4 |
| 2,914,043 | 11/1959 | Nallinger | 123/32 SA |
| 3,207,141 | 9/1965 | Freeman | 123/32 SA |
| 3,263,659 | 8/1966 | Francois | 123/32 SA |
| 3,270,722 | 9/1966 | Bernard | 123/32 ST |
| 3,363,611 | 1/1968 | Von Seggern | 123/32 SA |
| 3,443,552 | 5/1969 | Von Seggern | 123/32 SA |
| 3,659,564 | 5/1972 | Suzuki | 123/32 SA |

*Primary Examiner*—Manuel A. Antonakas
*Assistant Examiner*—Ronald B. Cox
*Attorney, Agent, or Firm*—Lyon & Lyon

[57] ABSTRACT

A four-cycle internal combustion engine employs a main combustion chamber supplied with a lean combustible mixture and an auxiliary combustion chamber supplied with a rich combustible mixture. A torch nozzle restriction connects the chambers. A spark plug is associated with the auxiliary chamber. A thin wall heat resistant cup spaced from the engine walls forms the auxiliary chamber and the cup is provided with apertures communicating with the main chamber and the spark plug. The main chamber is non-symmetrical and has its greatest depth between the torch nozzle restriction and the axis of the cylinder bore in which the piston reciprocates. The direction of the principal axis of the torch flame through the restriction is toward the center of mass of the air-fuel mixture in the main chamber when the piston is 90° past top dead center.

2 Claims, 4 Drawing Figures

TORCH NOZZLE ORIENTATION FOR INTERNAL COMBUSTION ENGINE

This application is a Continuation-in-Part of the co-pending application of Tadashi Kume filed Sept. 28, 1972, Ser. No. 292,995, now abandoned and entitled "Torch Nozzle Orientation For Internal Combustion Engine".

This invention relates to four-cycle internal combustion engines and is particularly directed to improvements over the device disclosed in the co-pending application of Tasaku Date et al, Ser. No. 291,254, filed Sept. 22, 1972, now abandoned and entitled "Reduction of $NO_x$, HC, and CO in the Exhaust Gases of Internal Combustion Engines". As pointed out in said co-pending application, it is generally known that the combustible mixture adjacent the relatively low-temperature cylinder walls does not burn completely in a conventional four-cycle engine, even when operated under the best of conditions. The oxidation of unburned hydrocarbons (HC) is actively promoted when the combustion temperature exceeds about 800° C., but the combustion temperature in a conventional four-cycle gasoline engine rapidly reaches a high value after ignition of the mixture, and rapidly lowers as the combustion gases expand. Consequently, the high temperature in which oxidation of HC occurs actively is of very short duration, resulting in exhausting of unburned hydrocarbons from the vicinity of the cylinder walls.

It is also generally known that carbon monoxide (CO) emissions are minimized when the combustible mixture is leaner than the stoichiometric air-fuel ratio. Such a lean mixture, however, is very poor in ignitability, resulting in unstable engine operation.

It is an important object of the present invention to minimize unburned hydrocarbons (HC) and carbon monoxide (CO) emissions in the exhaust gases of a four-cycle internal combustion engine. This is accomplished in the slow-burning combustion system of said co-pending application by directing the principal axis of the torch flame through the torch nozzle restriction to pass near the center of mass of the air-fuel mixture in the main combustion chamber, when the piston is 90° past top dead center. For the purpose of this determination, the mixture is assumed to be uniform throughout the main combustion chamber.

Other objects and advantages will appear hereinafter.

Figure 1:
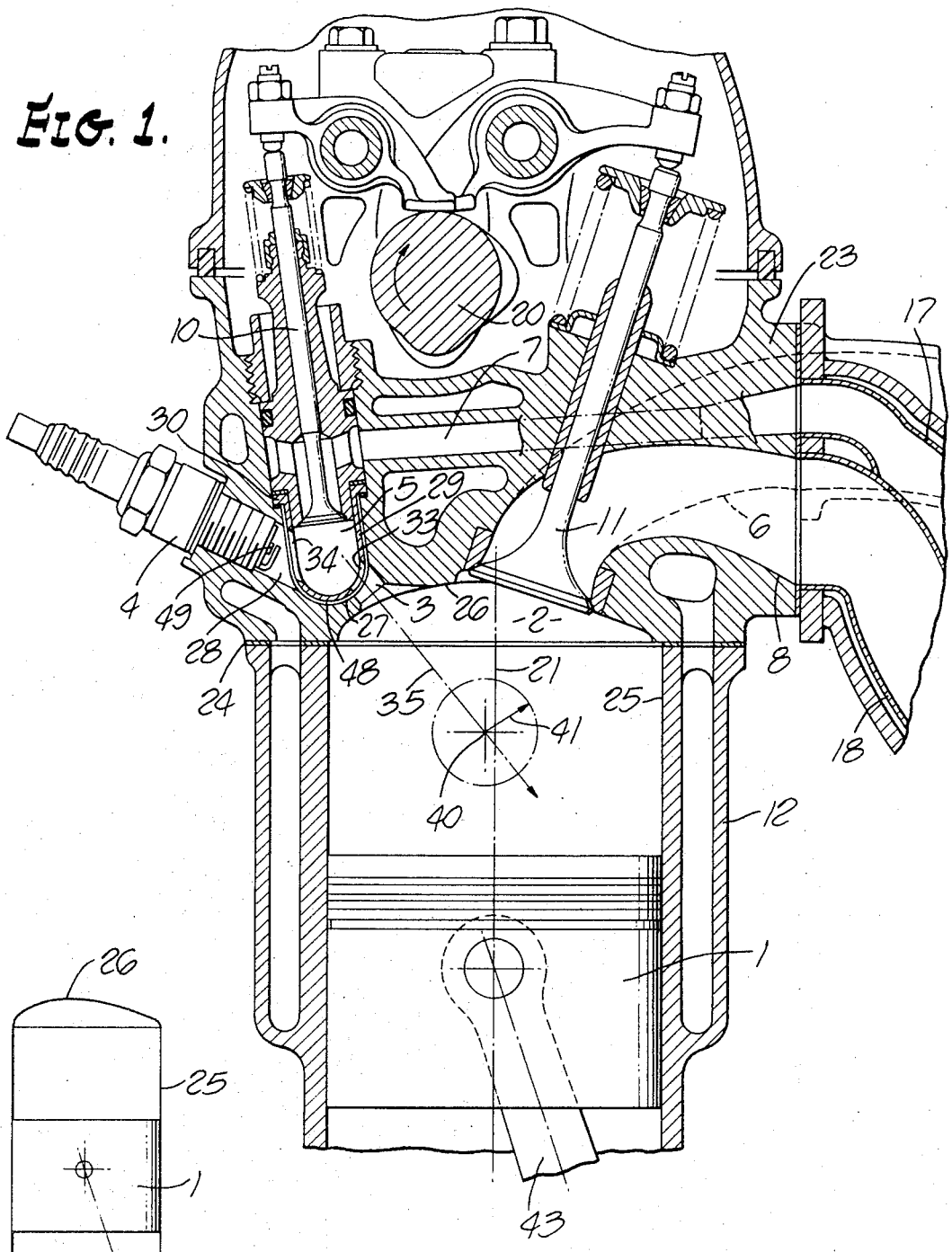
FIG. 1 is a sectional elevation taken substantially on lines 1—1 as shown on FIG. 3, illustrating a preferred embodiment of this invention.

Referring to the drawings, the internal combustion engine has a piston 1 defining a movable wall of the main combustion chamber 2. A torch nozzle restriction 3 connects the main combustion chamber 2 and the auxiliary combustion chamber 5, the latter being provided with a spark plug 4. The intake passage 6 to the main combustion chamber is controlled by an intake valve 9 and the intake passage 7 to the auxiliary chamber 5 is controlled by intake valve 10. The exhaust passage 8 from the main combustion chamber 2 is controlled by exhaust valve 11. The three valves are mounted in the engine head and operated by conventional means, including the cam shaft 20.

Figure 2:
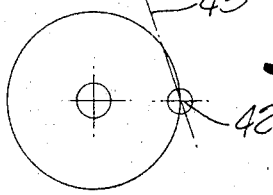
FIG. 2 is a diagram showing the crank-connected piston at 90° after top dead center.
Figure 3:
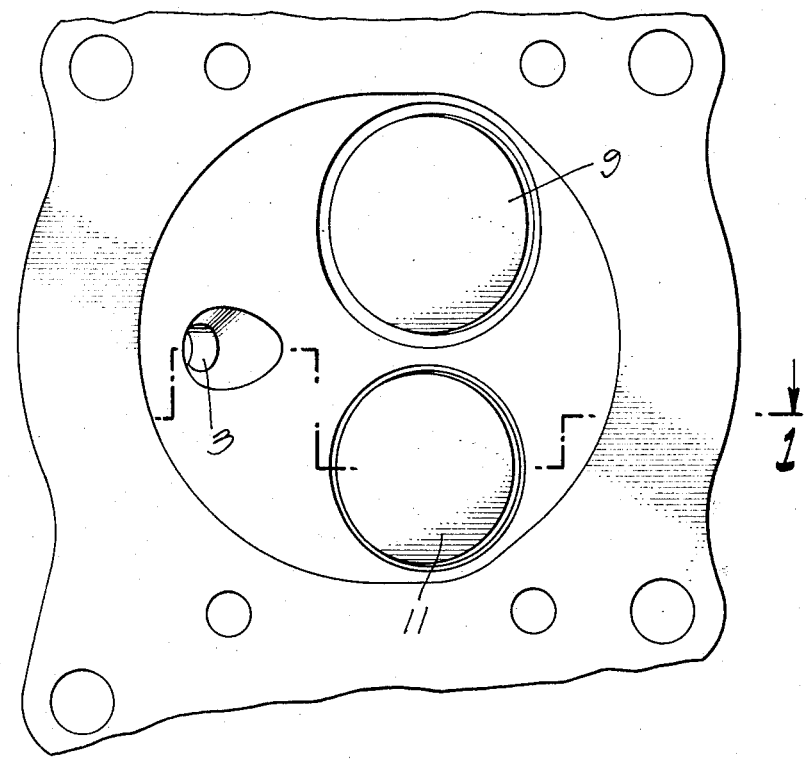
FIG. 3 is a plan view of the under side of the cavity in the engine head that forms a wall of the main combustion chamber.
Figure 4:
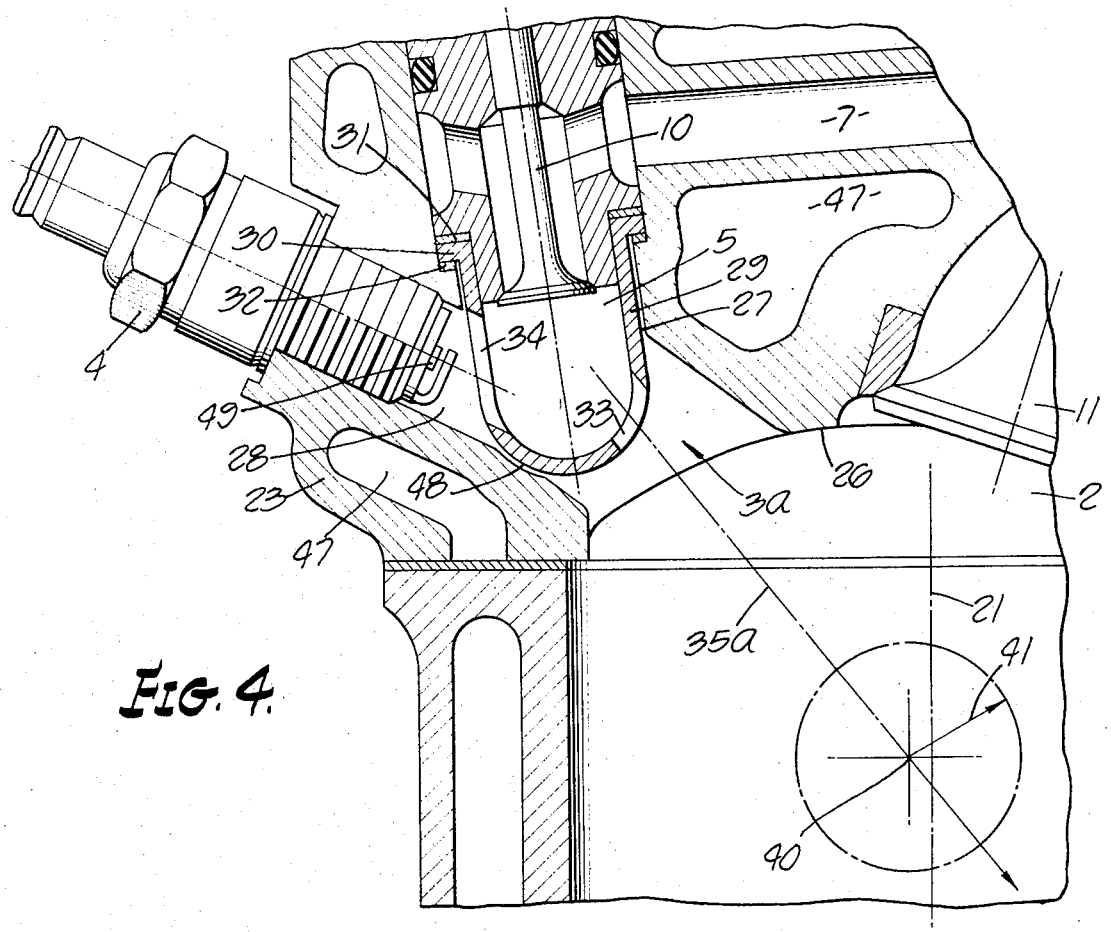
FIG. 4 is a sectional view similar to FIG. 1, showing a modification.

As shown diagrammatically in FIG. 2, the piston 1 is connected to the crank 42 by a conventional connecting rod 43. FIGS. 1, 2 and 4 of the drawings show the piston 1 in a position 90° after top dead center.

A relatively lean mixture is delivered through valve controlled intake passage 6 into the main combustion chamber 2, and a relatively rich mixture is delivered to the auxiliary chamber 5 through intake passage 7 and intake valve 10. The spark plug 4 ignites the rich mixture in the auxiliary chamber 5 and causes a flame to project through the torch nozzle restriction 3 to ignite the lean mixture in the main chamber 2. The exhaust gases from the main chamber 2 pass through the exhaust passage 8 and exhaust liner 18, and serve to heat the rich combustible mixture in the liner 17 to avoid condensation of fuel on the walls of the passage 7 and auxiliary chamber 5. The engine head 23 is secured to the engine block 12 by conventional means, not shown, and the usual gasket 24 may be clamped therebetween.

The main combustion chamber 2 is defined within the cylinder bore 25 between the top of the piston 1 and the curved surface 26 which defines a recess in the engine head 23, confronting the top of the piston. Portions of this main combustion chamber 2 are formed by the heads of the intake and exhaust valves. The recess in the engine head is not symmetrical but has the greatest depth on the same side of the axis 21 as the torch nozzle restriction 3. The axis 21 is the axis of the cylindrical bore 25. The recess has a circular boundary coincident with and substantially the same size as the cylinder bore 25. The auxiliary chamber 5 is laterally offset with respect to the axis 21.

The auxiliary combustion chamber 5 is defined within the thin wall heat resistant cup 29 and the spark plug recess 28. The clearance space 48 between the cup 29 and the curved walls 27 in the engine head 23 is so small as to have a negligible effect on the volume. The head of the valve 10 forms one wall of the auxiliary chamber 5. The cup 29 is held in place by means of a terminal flange 30 clamped in the engine head. The thin wall cup 29 has a first aperture 33 communicating with the main chamber 2 and a second aperture 34 which communicates with the spark plug recess 28.

The spark plug 4 is placed so that its electrodes 49 are positioned out of the path of the rich mixture passing from the intake valve 10 to the auxiliary chamber 5, in order to avoid fouling of the electrodes. The electrodes 49 are also placed out of direct alignment with the axis 35 of the torch nozzle restriction 3 so that the strong flow which occurs from the main chamber 2 to the auxiliary chamber 5 during the compression stroke of the piston 1 does not set up such a strong blast of gas through the torch nozzle restriction that might cause a misfire by blowout of the spark between the electrodes 49.

It has been found that the principal axis 35 of the torch flame through the restriction 3 should be inclined toward the center of mass of the air-fuel mixture in the main combustion chamber when the piston is 90° past top dead center in order to provide uniform distribution of flame propagation, particularly during the later stages of the power stroke. By contrast, in conventional three-valve engines the direction is generally above the top of the piston in top dead center position. This promotes better combustion in the remote corners or recesses of the combustion chamber during the power stroke. Furthermore, it has been found that the axis of the torch flame through the restriction may be spaced from said center of mass by an amount no greater than 16/100 of the diameter of the cylinder bore 25. Expressed in other terms, the axis 35 of the torch flame through the restriction intersects a sphere whose center 40 lies at the center of mass of the mixture in the main combustion chamber 2 when the piston is 90° past top dead center, and the radius 41 of said sphere is no greater than 16/100 of the diameter of the cylinder bore.

In the modification shown in FIG. 4, the opening 3a is enlarged so that a portion of the hot cup 29 is directly exposed to the main combustion chamber 2. The aperture 36 in the wall of the cup 29 becomes the torch nozzle restriction. The axis 35a is the principal axis of the torch flame projected through the aperture 36, and it extends in the same direction as described above. This modified form of the torch nozzle restriction has proved to be superior under cold start-up conditions. In other respects, the modification shown in FIG. 4 has the same construction and mode of operation as described above.

Having fully described my invention, it is to be understood that I am not to be limited to the details herein set forth but that my invention is of the full scope of the appended claims.

I claim:

1. In a spark-ignition internal combustion engine for minimizing unwanted emissions such as HC and CO, the engine having a crank-connected piston movable in a cylinder bore, the combination of: walls cooperating with the movable piston to form a main combustion chamber, walls forming a cavity laterally offset from the cylinder axis, a thin wall heat resistant cup positioned within the cavity and having a portion exposed to the main combustion chamber, said portion of said cup having an aperture constituting the sole torch nozzle restriction establishing communication between said chambers, a spark plug for igniting a combustible mixture in the auxiliary chamber to project a flame through the torch nozzle restriction, the torch nozzle restriction being positioned to cause the axis of the torch flame to pass near the center of mass of the air-fuel mixture in the main chamber when the piston is 90° past top dead center, the axis of the torch flame being spaced from said center of mass by an amount no greater than 16/100 of the diameter of the cylinder bore.

2. In a spark-ignition internal combustion engine for minimizing unwanted emissions such as HC and CO, the engine having a crank-connected piston movable in a cylinder bore, the combination of: walls cooperating with the movable piston to form a main combustion chamber, walls forming an auxiliary combustion chamber laterally offset from the cylinder axis, a torch nozzle restriction establishing communication between said chambers, the main chamber being non-symmetrical and having its greatest depth between said torch nozzle restriction and the cylinder axis, a spark plug for igniting a combustible mixture in the auxiliary chamber to project a flame through the torch nozzle restriction, the torch nozzle restriction being positioned to cause the axis of the torch flame to pass near the center of mass of the air-fuel mixture in the main chamber when the piston is 90° past top dead center, the axis of the torch flame being spaced from said center of mass by an amount no greater than 16/100 of the diameter of the cylinder bore.

* * * * *